June 25, 1963  G. R. E. LEZAN  3,095,513
FIRING PULSE CIRCUIT FOR SILICON CONTROLLED RECTIFIERS
Filed Feb. 9, 1962  3 Sheets-Sheet 2
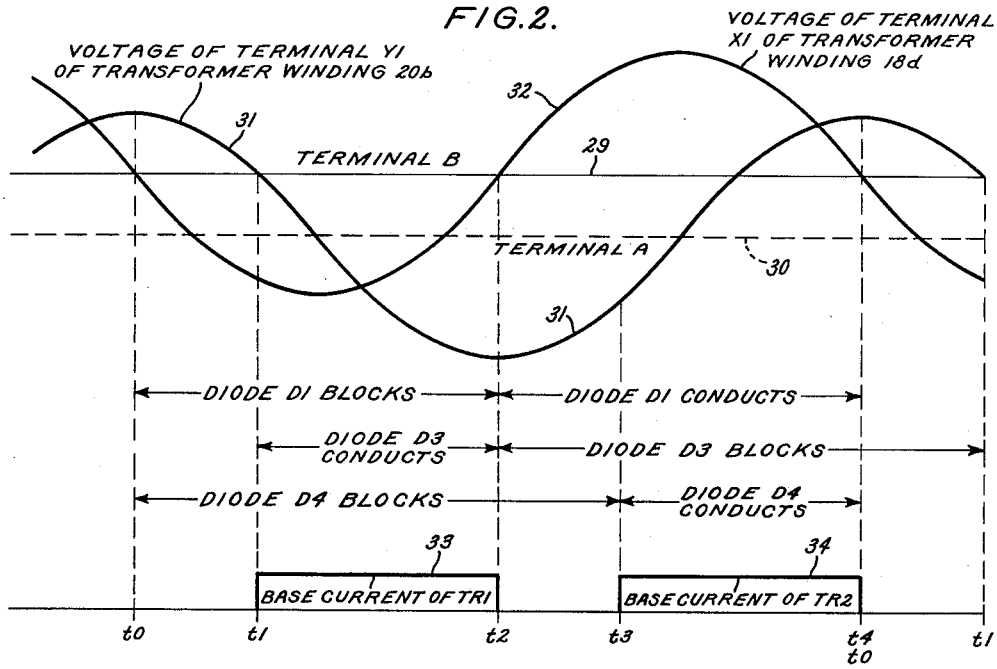
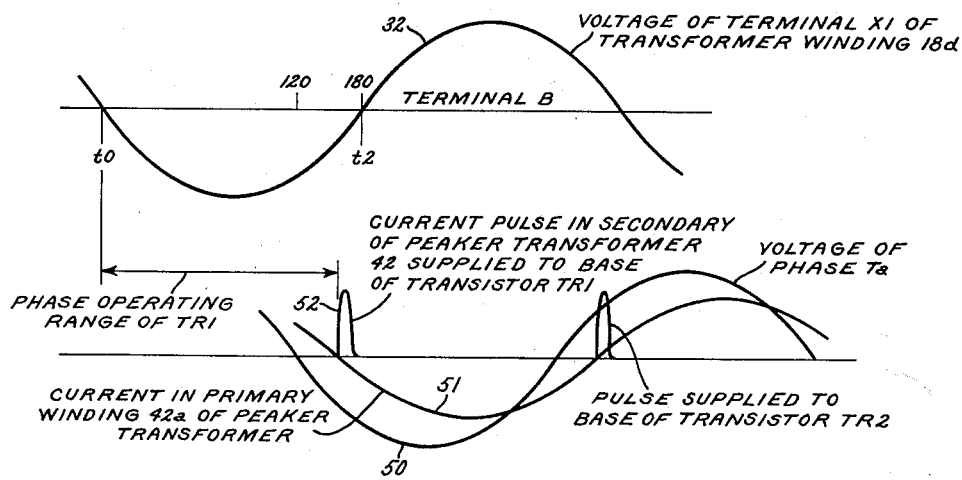
INVENTOR:
GEORGES R. E. LEZAN,
BY Irving H. Marshman
ATTORNEY

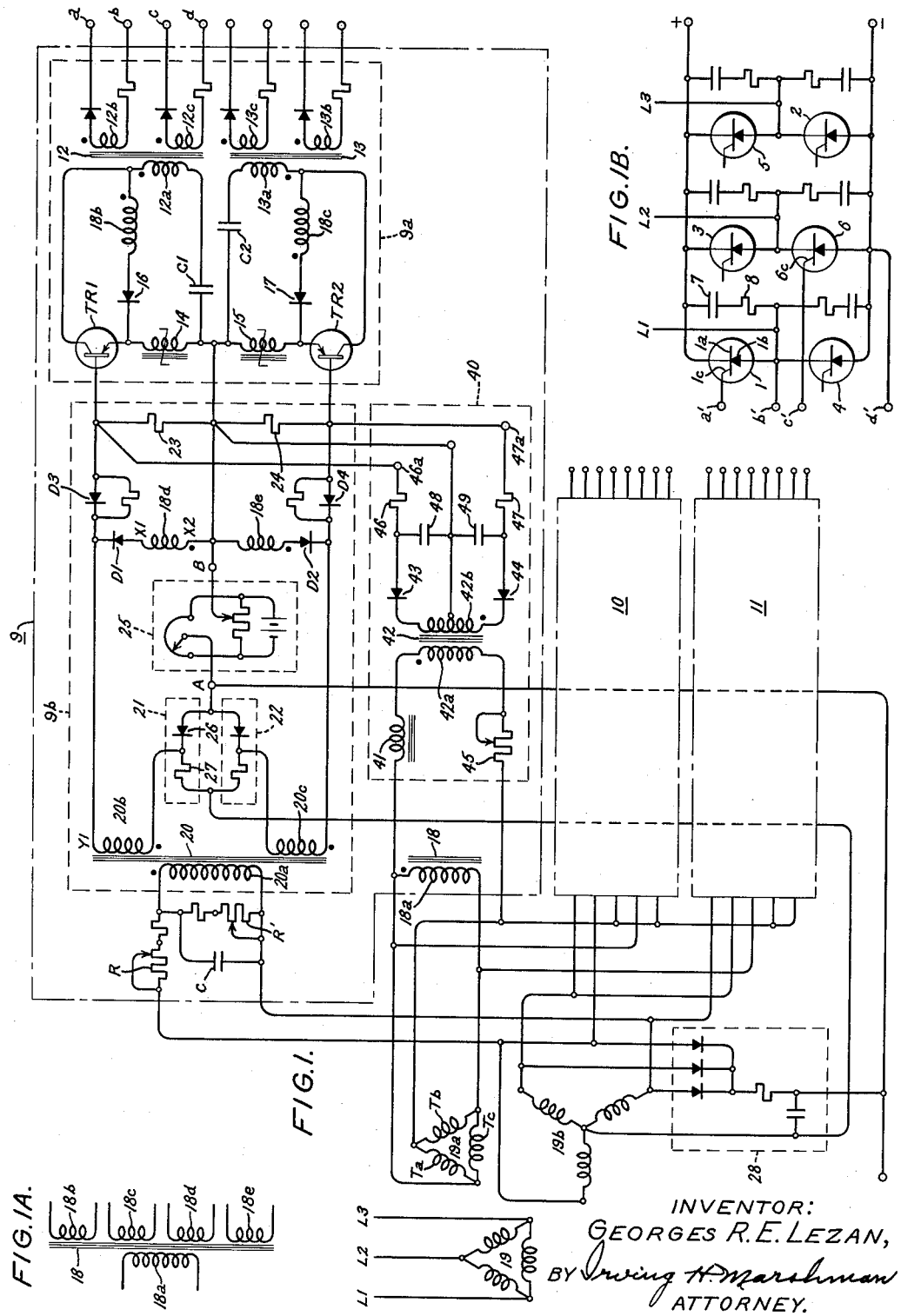

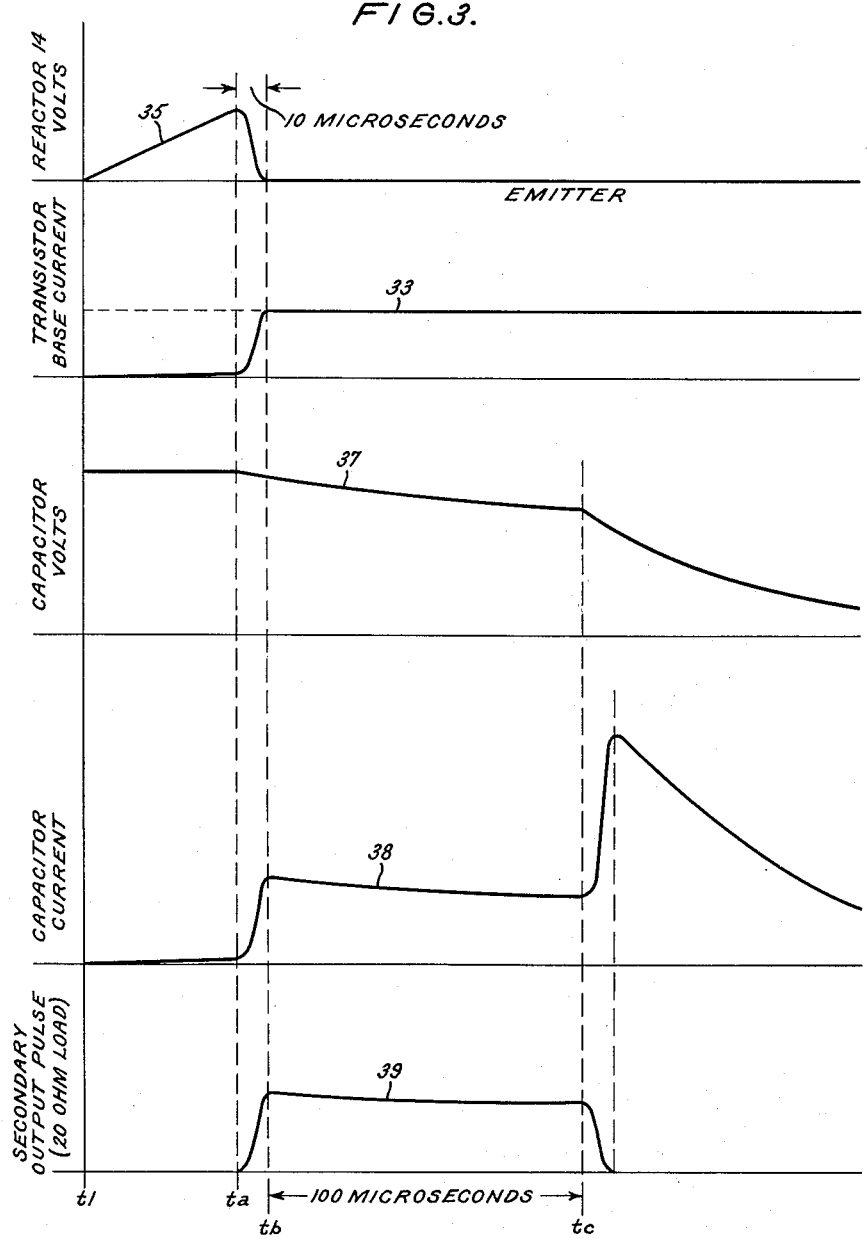

United States Patent Office 3,095,513
Patented June 25, 1963

3,095,513
FIRING PULSE CIRCUIT FOR SILICON
CONTROLLED RECTIFIERS
Georges R. E. Lezan, Haddonfield, N.J., assignor to General Electric Company, a corporation of New York
Filed Feb. 9, 1962, Ser. No. 172,273
7 Claims. (Cl. 307—88.5)

This invention relates to firing circuits for rectifiers and more particularly to firing circuits for solid state silicon controlled rectifiers and the like, and it has for an object provision of an inexpensive and improved firing circuit of this character.

Still more particularly, the invention relates to firing circuits in which a capacitor discharge is used to produce the firing pulse supplied to a silicon controlled rectifier and a further object of the invention is the provision of a firing circuit of the capacitor discharge type that is capable of producing firing pulses of sufficient magnitude and duration to fire a solid state controlled rectifier when paralleled by a commutating capacitor and when employed as one of the rectifiers in a polyphase double-way bridge rectifying configuration.

In carrying the invention into effect in one form thereof, a capacitor is provided as the energy storage element of the firing circuit for a solid state controlled rectifier having a gate circuit. Charging and discharging circuits are provided for the capacitor. In the discharge circuit are included in series relationship the main current conducting electrodes in the output circuit of a transistor, a hold-off saturable reactance device and a translating device through which a firing pulse from the discharge circuit is supplied to the gate circuit of the controlled rectifier. The hold-off reactance device and the translating device are also included in the charging circuit for the capacitor and the hold-off reactance device is also included in the input control circuit of the transistor which input circuit comprises its base electrode and one of the main current carrying electrodes. The input circuit is provided with two parallel branches to which dephased alternating voltages are supplied and to one of which a reversible polarity adjustable magnitude direct voltage is supplied for the purpose of varying the instant in each cycle at which the firing pulse is initiated.

For a better and more complete understanding of the invention, reference should now be had to the following specification and to the accompanying drawings in which:

FIG. 1 is a simple diagrammatic sketch of an embodiment of the inveniton,

FIG. 1A is a simple diagrammatic sketch of a detail of the FIG. 1 embodiment,

FIG. 1B is a simple diagrammatic sketch of a polyphase power rectifier in which a plurality of solid state silicon controlled rectifier elements are connected in double way configuration, and FIGS. 2, 3 and 4 are charts of characteristic curves which facilitate an understanding of the invention.

Referring now to the drawing and particularly to FIG. 1, a plurality of solid state silicon controlled rectifiers 1, 2, 3, 4, 5 and 6 are connected in a three-phase double-way configuration. This configuration is also known as a bridge configuration. Three phase alternating voltages from a suitable source represented by the three supply lines L1, L2 and L3 are supplied to the input terminals of the double-way configuration, and a rectifier direct voltage of the polarity indicated in FIG. 1B appears at the output terminals designated + and −. The silicon controlled rectifier 1, has an anode 1a, a cathode 1b and a gate electrode 1c, and of course the rectifiers 2, 3, 4, 5 and 6 have corresponding electrodes. The silicon controlled rectifier is a PNPN semiconductor device. An important operating characteristic of the silicon controlled rectifier is that once it has been turned on by the application of a gating pulse to its gate electrode, the gate electrode loses control of conduction through the device. Thereafter conduction can only be terminated by interruption of the load circuit through the main conducting path or by reducing to zero the voltage of the anode with respect to the cathode. For the purpose of suppressing surges, the series combination of capacitor 7 and resistor 8 is connected directly across the anode and cathode terminals of controlled rectifier 1 and a similar series combination is connected across each of the other controlled rectifiers in the double-way configuration.

With capacitors connected across the individual controlled rectifiers as in FIG. 1, either for surge suppression purposes or for sympathetic firing purposes, the double way circuit will not operate reliably in the discontinuous mode unless the gate pulses are made sufficiently wide, i.e., of sufficient duration. In the discontinuous mode of operation gating of two consecutive rectifier phases simultaneously becomes necessary to establish conduction through the load. Thus for example, for the double-way rectifier phase rotation L1, L2, L3, illustrated in FIG. 1, rectifiers 2 and 1 must be simultaneously pulsed; so also must rectifiers 3 and 2, 4 and 3, 5 and 4, 6 and 5, and 1 and 6.

The presence of the capacitors in the double-way circuit requires that the timing duration of the firing pulses applied to the gate of the controlled rectifiers be sufficiently long to permit the capacitor charges to redistribute themselves during the firing pulse periods following commutation. For capacitors of .5 mfd. and under, firing pulses of 100 microseconds duration or more provide reliable operation of the double-way configuration rectifier.

For the purpose of supplying to the gate circuits of the controlled rectifiers firing pulses of adequate duration, a plurality of firing pulse generators 9, 10 and 11, one for each phase of the double-way configuration, are provided. Since these firing pulse generators are identical, only the generator 9 for the first pulses in a cycle to rectifiers 1 and 4 and the second pulses in a cycle to rectifiers 6 and 3, is illustrated and described in detail. The pulse generator 9 may be regarded as comprising two main sections, i.e., a pulse generating section 9a and a plural dephased alternating voltage control circuit 9b. The pulse generating circuit 9a is illustrated as comprising capacitors C1 and C2, output transformers 12 and 13, hold-off saturable reactance devices 14 and 15, transistors TR1 and TR2 and diodes 16 and 17. Although the core members of saturable reactance devices 14 and 15 may be made of any suitable magnetic material, preferably they are made of an alloy sold under the trade name Hy-Mu 80. Other suitable core materials such as those sold under the trade names Supermalloy, Permalloy, Mopermalloy, and Mu-Metal may be used. Preferably the transistors TR1 and TR2 are PNP germanium transistors. The capacitors may be of any suitable type, for example, they may be either electrolytic capacitors or paper type capacitors.

As shown, transformers 12 and 13 are provided with primary windings 12a and 13a respectively and with secondary windings 12b and 12c, and 13b and 13c, respectively. Preferably the core material of the output transformers 12 and 13 is made of an alloy sold on the market under the trade name Delta Max. Each of the secondary windings is connected to the gate circuit of a corresponding one of the controlled rectifiers in the double-way configuration. In this connection, each of the terminals a, b, c and d in FIG. 1 is connected to a corresponding one of the terminals a', b', c' or d', respectively, in FIG. 1B so that secondary winding 12b is connected to the gate circuit of controlled rectifier 1 and secondary winding 12c is connected to the gate circuit of controlled rectifier 6. Since each controlled rectifier must be fired twice in 360 electrical degrees, the gate circuit of each rectifier is also connected to another secondary winding but in the interest of simplification of the drawing this is not illustrated.

For the purpose of producing firing pulses in alternation, i.e., on opposite half cycles of the alternating voltage wave, pulse generator circuit 9a has two symmetrical sections which are connected in a push-pull configuration. One of these symmetrical sections comprises the primary winding 12a, and associated secondary windings 12b and 12c, diode 16, saturable reactance device 14, capacitor C1 and transistor TR1. The diametrically disposed section of the firing pulse generator section comprises the primary winding 13a and associated secondary windings 13b and 13c, capacitor C2, diode 17 and transistor TR2. Alternating voltages for charging the capacitors C1, C2 are supplied by suitable means such as a control transformer 18 having a primary winding 18a and secondary windings 18b, 18c, 18d and 18e as shown in FIG. 1A. The primary winding is connected to a suitable source of alternating voltage such as the phase Tc of a Delta connected secondary winding 19a of a supply transformer 19. Secondary winding 18b of the control transformer is connected in series relationship with capacitor C1, and secondary winding 18c is connected in series relationship with capacitor C2. As thus connected, the charging circuit for capacitor C1 comprises the secondary winding 18b, diode 16, saturable reactance device 14 and primary winding 12a of the output transformer all connected in series relationship with capacitor C1 in a series loop circuit. Similarly the charging circuit for capacitor C2 comprises a secondary winding 18c, diode 17, saturable reactance device 15 and primary winding 13a connected in series relationship with capacitor C2. The discharge circuit for capacitor C1 is also a series loop circuit and comprises the saturable reactance 14, the main conducting path or output circuit of transistor TR1 and the primary winding 12a of output transformer 12. Similarly the discharge circuit for the capacitor C2 comprises the saturable reactance device 15, the main conducting path of transistor TR2 and the primary winding 13a of transformer 13. As indicated in FIG. 1, the diode rectifiers 16 and 17 in the transformer secondary winding circuits are poled to charge the capacitors C1 and C2 in alternation, i.e., during opposite half cycles of the alternating voltage supplied to the primary winding 18a.

The plural dephased alternating voltage control circuit 9b for the pulse generator section comprises the transformer 20, two additional secondary windings 18d and 18e of transformer 18, diodes D1, D2, D3 and D4, current limiting devices 21 and 22, resistors 23 and 24 and a source 25 of adjustable and reversible polarity direct voltage having terminals A and B. This control circuit may be considered as comprising two symmetrical sections each for controlling the conduction and non-conduction periods of a corresponding one of the transistors TR1 and TR2. The section of the control circuit for transistor TR1 extends externally of the transistor from its emitter electrode to its base electrode and comprises a combination of two parallel branches and the diode D3 connected in series relationship with the parallel combination. One of these branches comprises the source 25 of adjustable direct voltage, current limiting device 21 and secondary winding 20b of control transformer 20. The other branch comprises transformer secondary winding 18d of transformer 18 and diode D1 connected in series relationship with each other between the junction point of the two branch circuits, i.e., terminal B and the cathode of diode D3 in the base circuit of transistor TR1.

Although the current limiting devices 21 and 22 may be of any suitable type, preferably they are nonlinear resistance devices which have the property of presenting a relatively insignificant impedance to currents up to a predetermined current limiting value and a relatively much higher impedance to currents that tend to exceed the current limit value, so that throughout a wide range of applied voltages the current remains essentially constant at the current limiting value.

As shown, current limiting device 21 comprises a diode rectifier 26, resistor 27 and a D.-C. source 28 which is illustrated as a 3-phase rectifier supplied from the Y connected secondary winding 19b of main supply transformer 19. Preferably, current limiting device 22 is similar to device 21 as shown in FIG. 1.

The primary windings 18a and 20a of the transformers 18 and 20 are supplied from suitable sources with dephased A.-C. voltages, e.g., these voltages may be and preferably are approximately in quadrature. Sinusodial approximately quadrature voltages are induced in the secondary windings and are supplied to the separate branches of the control circuit. Certain circuit specifications may require that the phase relationship between these two voltages be slightly less than 90-degrees, e.g., 84-degrees. A portion of this phase displacement, e.g., 54° may be produced by a phase shifting network in the primary circuit of transformer 20 which is illustrated as comprising a series rheostat R and a parallel combination capacitor C and rheostat R'. From the source 25 a direct voltage is supplied to the terminals A and B. It could be supplied from the source 28 if desired.

In the following description, it is assumed that the voltage at terminal B is positive with respect to the voltage at terminal A. This is illustrated in FIG. 2 in which the voltage at terminal B is assumed to be the zero reference voltage point and is represented graphically by the horizontal line 29. Since terminal B is directly connected to terminal x2 of secondary winding 18d, line 29 also represents the voltage of terminal x2. In accordance with the assumption that terminal A is negative with respect to terminal B, the voltage of terminal A is represented by the dashed horizontal line 30 beneath line 29. The alternating voltage supplied to the control circuit by the secondary winding 20b of the control transformer is represented by the sinusoidal curve 31 and that supplied by the secondary winding 18d is represented by sinusoidal curve 32.

In FIG. 2 the conducting periods of diodes D1, D2, D3 and D4 are designated by arrows with appropriate legends. Each of these rectifiers is blocking for that part of the cycle in which it is not conducting. It is to be noted in FIG. 2 that one cycle of the signal alternating voltage represented by curve 31 begins at the positive crest at time t0 and ends at the next positive crest at time t4. Since the end of one cycle coincides with the beginning of the next cycle both designations t0 and t4 are applied to the second and all succeeding positive crests of the voltage represented by curve 31.

With the above understanding of the elements and their organization the operation of the firing pulse circuit will readily be understood from the following description. During the time interval t2 to t4 the voltage at terminal x1 of secondary winding 18d is positive with respect to terminal B and therefore diode D1 conducts. Diode D3 starts to conduct when the voltage at terminal y1 of transformer winding 20b (curve 31) becomes negative with respect to terminal B and it stops conducting when the voltage of terminal x1 of transformer 18d (curve 32) becomes positive with respect to the voltage at terminal B. Thus, diode D3 conducts only during the interval t1 to t2, and blocks for the remainder of the cycle and until time t1 of the next succeeding cycle. Consequently a turn-on signal cannot be supplied to the base electrode of transistor TR1 during the interval t2 to the next following t1. Similarly, owing to the symmetry of the two halves of the circuit, the diode D4 blocks during the period t0 to t3 and a turn-on signal cannot be supplied to the base electrode of transistor TR2 during this period. It conducts during the period $t3$ to $t4$ and during this period a turn-on signal can be supplied to the base of TR2. In other words, diode D3 conducts during successive $t1$ to $t2$ intervals and diode D4 conducts during successive $t3$ to $t4$ intervals. As graphically illustrated by curve 33 in FIG. 2, base current is supplied to the transistor TR1 whenever diode D3 is conducting and consequently transistor TR1 conducts whenever diode D3 conducts, i.e., it conducts in the successive $t1$ to $t2$ periods. Similarly, transistor TR2 conducts whenever diode D4 conducts; consequently it conducts during the periods $t3$ to $t4$ in successive cycles. Since the forward impedance of diode D3 and transistor TR1 are relatively low they do not interfere with the rapid buildup of the base current to the current limited value determined by the current limiting device 21. The current limited value is represented by the horizontal portion of curve 33.

It wil be noted that transistor TR1 becomes conducting as a result of the voltage of terminal $y1$ of transformer winding $20b$ (as represented by curve 31) becoming more negative than terminal B at time $t1$. Consequently this voltage serves as a turn-on voltage. Similarly, the transistor TR1 is turned off as a result of the voltage of terminal $x1$ of transformer $18d$ (as represented by curve 32) becoming more positive than terminal B; thus this voltage serves as a turn-off voltage.

In FIG. 3 the curves are drawn on a time scale that is greatly enlarged in comparison with the time scale of FIG. 2. In this connection the portion of curve 33 betwen $t1$ and $tb$ corresponds to the time of the vertical rise of curve 33 at time $t1$ in FIG. 2. At time $t1$ and immediately thereafter, the base current of transistor TR1, the voltage across saturable reactance device 14, the voltage across capacitor C1, the discharge current of capacitor C1 and the firing pulse output current in the secondary winding $12b$ of the firing pulse transformer are graphically represented by the characteristic curves 33, 35, 37, 38 and 39 respectively. In the charging circuit of capacitor C1 the diode 16 and the secondary winding $18b$ are poled to charge the capacitor during the off period of transistor TR1, i.e., the transistor is charged during the positive half cycle of the voltage of terminal $x1$ of secondary winding $18d$. Consequently, at time $t1$ in each cycle, the capacitor C1 is charged to the maximum voltage as represented by the initial horizontal portion of curve 37 whereas, the values of the other characteristics represented by curves 33, 35, 38, and 39 are zero at this instant.

At time $t1$ in each cycle, the voltage at terminal $y1$ of signal transformer winding $20b$ becomes more negative than the terminal B and a small voltage begins to appear in the emitter to base input circuit of transistor TR1 and a small amount of current begins to flow. An amplified version of this input current appears in the emitter to base output circuit. This output current is supplied by the capacitor C1. Since the saturable reactance device 14 is included in series in both the input circuit and the output circuit of transistor TR1, the exciting current of the reactance device is the sum of the input and output currents. As the signal voltage becomes increasingly negative, the saturable reactance device 14 stands off this increasing signal voltage as represented by the linearly rising portion of curve 35, and thus the rate of increase of input current and output current of the transistor TR1 is limited to a very low value as graphically represented by the gradual rise of curves 33 and 38 between times $t1$ and $ta$. Consequently, during this interval, the increasing signal voltage appears across the reactance device with the result that the emitter to base input current is too small to produce saturation of the transistor. However, at time $ta$ sufficient volt seconds have been applied to the saturable reactance device to bring it almost to the point of magnetic saturation. In the interval between time $ta$ and $tb$ which may be of the order of 10 microseconds, the saturable reactance device becomes fully saturated with the result that the voltage across its terminals is abruptly transferred to the remaining parts of the input circuit. This cauees the emitter to base input current to rise abruptly in the same 10 microsecond interval to the current limited value represented by the ordinate of curve 33 at time $tb$ and it continues at this value until time $t2$ (FIG. 2). As a result of the abrupt increase in input current, the transistor TR1 becomes saturated and is switched from substantially cut off to full on in the same brief $ta$ to $tb$ interval. The greater part of the voltage of capacitor C1, which prior to time $ta$ was applied across the emitter and collector of transistor TR1 is now abruptly transferred to the primary winding $12a$ of the output transformer and the capacitor discharge current curve 38 rises abruptly in the interval $ta$ to $tb$ to maximum value. Assuming 18 volts on the capacitor when fully charged at time $ta$ and further assuming a 3:1 turns ratio of the output transformer and a 20 ohm load in the secondary circuit, the capacitor discharge current will rise to a value of 33 milliamperes and the secondary firing pulse current curve 39 will rise to a value of 100 milliamperes. The capacitor will continue to discharge and cause current to be supplied to the gate circuit of the controlled rectifier. At time $tc$ which may be of the order of 100 microseconds after $tb$ the core of the firing pulse transformer 12 becomes saturated and the primary winding, no longer able to support voltage at its terminals, the output current in the secondary circuit is abruptly terminated to complete the firing pulse to the gate circuit.

If a significant portion of the exciting current of the saturable reactance device 14 were present in the input circuit of the transistor TR1 the transistor would become conducting prior to saturation of the reactance device and thus the abrupt rate of rise of input current to the transistor that is essential to the required abrupt rate of rise of the output firing pulse 39 would not be obtained. As a result the core of the output transformer might become saturated before the output pulse attained its full amplitude and the resulting diminished area output pulse would be insufficient to fire the controlled rectifier. Including the saturable reactance 14 device both in the input and output circuits of the transistor TR1 solves this problem because all but a very small fraction of the exciting current of the reactance device will be supplied from a source in the output circuit, i.e., from the capacitor C1. The small amount of exciting current obtained from the input circuit will be approximately the exciting current of the saturable reactance device divided by the current gain of the transistor. This will be such a small fraction of the total exciting current as not to result in significant conduction by the transistor prior to saturation of the reactance device. After the pulse has been terminated capacitor discharge current continues to be present in the output circuit of the transistor including the reactance winding 14. Owing to the saturation of the core of the output transformer this current rises steeply to a very high value, e.g., 200 milliamperes as represented by the steeply ascending portion of curve 38 following time $tc$ and then decays exponentially toward zero as long as the base current maintains transistor TR1 conductive, i.e., until time $t2$ in FIG. 2 when the transistor is turned off. At time $t3$ transistor TR2 is turned on as represented graphically by the curve 34 in FIG. 2 and owing to symmetry of the two diametrical sections of the pulse generator the above operation is repeated this time with diodes D2 and D4, saturable reactor 15, capacitor C2 and output pulse transformer 13.

During the half cycle of the alternating voltage in which the capacitor C2 is being discharged, the capacitor C1 is being charged and the charging current resets the cores of the reactor 14 and the transformer 12 to leave them in a condition to repeat the above operation in the following cycle.

The phase relationship between the output pulses and a set phase reference on a 60-cycle supply may be made to vary by approximately 170 electrical degrees by adjustment of the D.-C. control signal voltage between terminal A and terminal B from a maximum positive to a maximum negative value or the reverse. By adjusting the magnitude of the direct voltage, the application of the current front represented by the abrupt rise of curve 33 can be made to vary through the time interval t0 to t2. When this current front occurs at t0, the output phase pulse is described as "full advance." From this point, by decreasing the direct voltage from the negative value equal to the peak of the signal voltage of transformer 20 (represented by curve 31) the phase position of this output pulse may be retarded. When the direct voltage is zero, the retardation is 90-degrees and if the polarity of the direct voltage is reversed and increased to peak amplitude of the signal voltage, a retard angle of 180-degrees is, theoretically, obtainable. In practice, as the pulse is retarded beyond 90-degrees the rise time of its current front increases so that for retardation in the vicinity of 180-degrees the time required is increased to such an extent that the output firing pulses are decreased to extinction.

In certain applications excessive retardation of the firing pulse may have undesirable consequences and in order to prevent this, a retard stop accessory 40 is provided. It comprises a reactor 41, a transformer 42 and associated diodes 43 and 44, rheostat 45, resistors 46 and 47 and capacitors 48 and 49. The reactor 41 and the rheostat 45 are connected in series relationship with the primary winding 42a of the transformer and this primary circuit is connected to be supplied from the phase Ta of the delta wound secondary winding 19a of the supply transformer. The voltage of this phase lags the voltage of terminal x1 of transformer winding 18d. This is illustrated graphically in FIG. 4 in which the sinusoidal curve 32 represents the voltage of terminal x1 and the sinusoidal curve 50 represents the voltage of phase Ta. The current in reactor 41 is represented by the sinusoidal curve 51.

Terminals 46a and 47a in the secondary circuit are connected to the base electrodes of transistors TR1 and TR2 respectively and the midtap of the secondary winding 42b is connected to the terminal B. Transformer 42 operates as a peaker transformer and produces a current pulse 52 that is supplied to the base circuit of the transistor TR1 a fixed number of electrical degrees after the terminal x1 of transformer winding 18d becomes negative with respect to terminal B, that is to say a fixed number of degrees after the end of the off period of transistor TR1. The retard angle of this pulse may be adjusted through the range of 120-degrees to 170-degrees by the rheostat 45 in the primary circuit of the peaker transformer 42. At a selected preadjusted phase angle, e.g., 170-degrees after t0 the peaker transformer supplies a current pulse 52 to the base circuit of transistor TR1. This turns the transistor full on which in turn causes the capacitor C1 to discharge and generate a pulse in the output circuit that is supplied to the gate circuit of controlled rectifier 1. Once the transistor TR1 has been switched to the conductive state and a firing pulse has been generated in the output circuit the energy of the five mfd. capacitor in the emitter to collector circuit is exhausted and no second pulse can be generated until capacitor C1 is charged again in the off period of transistor TR1. Thus this preset retard stop circuit causes conduction of the transistor TR1 and generation of a firing pulse at a preadjusted maximum retard angle and thereby prevents generation of an output pulse in each cycle at any phase angle greater than this selected preadjusted maximum angle of retard. In other words the circuit prevents excessive retardation of the firing pulse. The above operation of the retard stop circuit is repeated diametrically in each cycle for the transistor TR2.

Considerable latitude may be exercised in the choice of sizes, values and ratings of the component elements of the invention. By way of illustration and not limitation, excellent results will be produced by a firing circuit of which the principal elements have the sizes, values or ratings set forth in the following table:

| Element | Type | Size | Rating |
| --- | --- | --- | --- |
| All diodes | 1N538 | 500 mw | |
| Saturable reactance devices 14 and 15. | P-4153H1 Toroid. | 120 turns | |
| Output transformers 12 and 13. | P-1040-02 | 60 turns primary. 20 turns secondary. | |
| Signal transformer 20 | open shell | | Primary: 50 vac. Secondary: 15.9 v. |
| Limit transformer 18 | do | | Primary 120 vac. Secondary: 16.3 vac. |
| Transformer 42 | P4176H1 Toroid. | 80 turns per winding. | |
| Resistors 23 and 24 | wire wound | 1,500 ohms | .5 watt. |
| Rheostat 45 | do | 1,000 ohms | .4 watt. |
| Transistors TR1 and TR2 | 2N1042-2 or 2N43. | 200 mw | |
| Capacitors C1 and C2 | Electrolytic | 5 mfd | 2.5 volts. |
| Capacitors 48 and 49 | Paper | .1 mfd | 100 volts. |

Although a preferred embodiment of the invention has been illustrated and described it will be understood that the invention is not limited thereto since alterations and modifications will readily occur to persons skilled in the art without departing from the true spirit of the invention or from the scope of the annexed claims.

What I claim as new and desire to secure by Letters Patent of the United States is:

1. A firing circuit for a solid state controlled rectifier having a gate circuit for receiving firing pulses comprising:
   (a) a capacitor,
   (b) a charging circuit for said capacitor including a saturable core reactance device and a translating device,
   (c) a discharge circuit for said capacitor comprising a transistor having a control electrode and having main current conducting electrodes connected in series circuit relationship with said reactance device, said translating device and said capacitor,
   (d) a control circuit for said transistor including one of said main electrodes and said control electrode and having two parallel branches,
   (e) means for supplying to said branches alternating voltages that are dephased with respect to each other in substantial amount, and
   (f) means for supplying to said control circuit a direct voltage of adjustable value.

2. The firing circuit as claimed in claim 1 wherein the core of the saturable reactance device is made of a material having a rectangular hysteresis loop.

3. A firing circuit for a solid state controlled rectifier having a gate circuit for receiving firing pulses comprising:
   (a) a capacitor,
   (b) a charging circuit for said capacitor comprising a translating device, a saturable core reactance device and a rectifier connected in series relationship with said capacitor,
   (c) a discharge circuit for said capacitor comprising a transistor having main current conducting electrodes connected in circuit with said reactance device, said translating device and said capacitor and having a control electrode,
   (d) a control circuit including one of said main electrodes and said control electrode and having two parallel branches, (e) means for supplying substantially quadrature dephased alternating voltages to said branches, (f) means for supplying to said charging circuit an alternating voltage synchronously related to said alternating voltages, and (g) means for supplying to a first of said branches an adjustable value direct voltage for adjustably controlling the turn on point of said transistor in each cycle of the turn on voltage supplied to said first branch.

4. A firing circuit for a solid state controlled rectifier having a gate circuit for receiving firing pulses comprising:

(a) a capacitor, (b) a charging circuit for said capacitor comprising a translating device and a saturable core reactance device connected in series relationship with said capacitor, (c) a discharge circuit for said capacitor comprising a transistor having main current conducting electrodes connected in series circuit relationship with said reactance device, said translating device and said capacitor and having a control electrode, (d) a control circuit including said reactance device, one of said main electrodes and said control electrode connected in series relationship and having two parallel branches, (e) means for supplying an alternating turn on voltage to one of said branches to render said transistor conducting once in each cycle of said turn on voltage to discharge said capacitor, (f) means for supplying to said control circuit a turn off alternating voltage substantially in quadrature with said turn on voltage for turning off said transistor in alternate half cycles thereof, (g) means for supplying to said charging circuit an alternating voltage synchronously related to said turn on and turn off voltages, (h) a rectifier included in said charging circuit poled to charge said capacitor during the half cycles in which said transistor is turned off, and (i) means for supplying to one of said branches a direct voltage of adjustable value for varying the point of initiating conduction of said transistor in each cycle of said turn on voltage.

5. The firing circuit claimed in claim 4 wherein the capacitor charge and capacitor discharge circuits have a common portion and said translating device comprises a transformer having its primary winding connected in a circuit that includes said common portion.

6. A firing circuit for a solid state controlled rectifier having a gate circuit for receiving firing pulses, comprising:

(a) a capacitor, (b) a charging circuit for said capacitor comprising a saturable core reactance device, (c) a discharge circuit for said capacitor comprising a transistor having a control electrode and having main current conducting electrodes connected in circuit with said reactance device, said translating device and said capacitor, (d) a control circuit for said transistor including one of said main electrodes and said control electrode and having two parallel branches, (e) means for supplying substantially quadrature dephased alternating voltages to said branches comprising a first transformer having its secondary winding connected in one of said branches for supplying an alternating turn on voltage thereto to render said transistor conducting in each cycle of said turn on voltage and further comprising a second transformer having a secondary winding connected in the other of said branches for supplying to said control circuit a turn off voltage for turning off said transistor at the end of a conduction period in each cycle, (f) means for supplying to said charging circuit an alternating voltage synchronously related to said turn on and turn off voltages comprising a secondary winding on said second transformer connected in said charging circuit, a rectifier included in said charging circuit poled to charge said capacitor during the periods in which said transistor is nonconducting and, (g) means for supplying to one of said branches a direct voltage of adjustable value for varying the point of initiation of conduction in each cycle of said turn on voltage.

7. The firing circuit claimed in claim 4 wherein: the means for supplying quadrature turn on and turn off voltages to the branches of the control circuit comprises a pair of sources of substantially quadrature dephased alternating voltages and a pair of transformers each supplied from a different one of said sources and each having a secondary winding connected in a corresponding one of said branch circuits and wherein, the means for supplying an alternating voltage to the capacitor charging circuit comprises an additional secondary winding on the turn off voltage transformer connected in series in the charging circuit.

No references cited.